United States Patent
Pisklak et al.

(10) Patent No.: US 11,078,400 B2
(45) Date of Patent: Aug. 3, 2021

(54) ACCELERATORS FOR COMPOSITE CEMENT COMPOSITIONS

(71) Applicant: Halliburton Energy Services, Inc., Houston, TX (US)

(72) Inventors: Thomas Jason Pisklak, Cypress, TX (US); Sean William Riggio, Houston, TX (US); Ronnie Glen Morgan, Waurika, OK (US); Thomas Singh Sodhi, Humble, TX (US); Simone E A Lumsden, Pearland, TX (US); Samuel J. Lewis, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/479,023

(22) PCT Filed: Feb. 22, 2017

(86) PCT No.: PCT/US2017/018937
§ 371 (c)(1),
(2) Date: Jul. 18, 2019

(87) PCT Pub. No.: WO2018/156119
PCT Pub. Date: Aug. 30, 2018

(65) Prior Publication Data
US 2019/0367796 A1    Dec. 5, 2019

(51) Int. Cl.
*C09K 8/467* (2006.01)
*C04B 22/12* (2006.01)
(Continued)

(52) U.S. Cl.
CPC ............ *C09K 8/467* (2013.01); *C04B 22/124* (2013.01); *C04B 22/147* (2013.01);
(Continued)

(58) Field of Classification Search
CPC ..... C09K 8/467; C04B 22/124; C04B 22/147; C04B 28/021; C04B 28/04; E21B 33/14
See application file for complete search history.

(56) References Cited

U.S. PATENT DOCUMENTS 3,340,929 A * 9/1967 Slagle ...................... C09K 8/42
166/292
4,337,094 A  6/1982 Tokar
(Continued)

FOREIGN PATENT DOCUMENTS

| CN | 102492404 | 6/2012 |
| WO | 2014052086 | 4/2014 |
| WO | 2017003432 | 1/2017 |

OTHER PUBLICATIONS

ISRWO International Search Report and Written Opinion for PCT/US2017/018937 dated Nov. 27, 2017.
(Continued)

*Primary Examiner* — Crystal J Miller
(74) *Attorney, Agent, or Firm* — Thomas Rooney; C. Tumey Law Group PLLC

(57) ABSTRACT

Disclosed herein are methods, compositions, and systems for cementing. A method of cementing may comprise: providing a composite cement composition comprising a pozzolan, an accelerator, and water, wherein the accelerator comprises a chloride salt and a sulfate salt, wherein the composite cement composition is free of Portland cement or comprises Portland cement in an amount of about 50% by weight of cementitious components or less; and allowing the composite cement composition to set.

16 Claims, 6 Drawing Sheets

(51) Int. Cl.
*C04B 22/14* (2006.01)
*C04B 28/02* (2006.01)
*C04B 28/04* (2006.01)
*E21B 33/14* (2006.01)
*C04B 103/12* (2006.01)

(52) U.S. Cl.
CPC ............ *C04B 28/021* (2013.01); *C04B 28/04* (2013.01); *E21B 33/14* (2013.01); *C04B 2103/12* (2013.01)

(56) References Cited

U.S. PATENT DOCUMENTS

| | | | |
|---|---|---|---|
| 4,444,593 | A | 4/1984 | Schutz |
| 7,607,484 | B2 | 10/2009 | Roddy et al. |
| 7,631,692 | B2 | 12/2009 | Roddy et al. |
| 7,806,183 | B2 | 10/2010 | Roddy et al. |
| 7,892,352 | B2 | 2/2011 | Roddy et al. |
| 8,281,859 | B2 | 10/2012 | Roddy et al. |
| 8,333,240 | B2 | 12/2012 | Roddy et al. |
| 8,486,869 | B2 | 7/2013 | Brenneis et al. |
| 8,609,592 | B2 | 12/2013 | Guenthenspberger et al. |
| 8,851,173 | B2 | 10/2014 | Brothers et al. |
| 8,997,578 | B2 | 4/2015 | Morgan et al. |
| 9,023,150 | B2 | 5/2015 | Brenneis et al. |
| 9,212,534 | B2 | 12/2015 | Ballew et al. |
| 9,505,972 | B2 | 11/2016 | Iverson et al. |
| 9,644,132 | B2 | 5/2017 | Morgan et al. |
| 10,370,579 | B2 | 8/2019 | Agapiou et al. |
| 2008/0066655 | A1 | 3/2008 | Fraser |
| 2008/0178770 | A1 | 7/2008 | Schumacher et al. |
| 2009/0194283 | A1 | 8/2009 | Ermel et al. |
| 2009/0200029 | A1 | 8/2009 | Roddy et al. |
| 2011/0000400 | A1* | 1/2011 | Roddy .................. C04B 18/10 106/679 |
| 2014/0130716 | A1* | 5/2014 | Chatterji ............. C04B 40/0039 106/698 |
| 2014/0318784 | A1* | 10/2014 | Chatterji ............... E21B 33/138 166/293 |
| 2014/0352963 | A1* | 12/2014 | Mahmoudkhani ....... C09K 8/48 166/292 |
| 2015/0197453 | A1* | 7/2015 | Pisklak .................. C04B 28/18 427/372.2 |
| 2015/0284621 | A1 | 10/2015 | Marchesini et al. |
| 2017/0114266 | A1* | 4/2017 | Bryant .................... C04B 28/02 |
| 2017/0364607 | A1 | 12/2017 | Kaushik et al. |
| 2018/0037501 | A1* | 2/2018 | Guynn .................... C04B 18/08 |
| 2018/0257989 | A1* | 9/2018 | Shi ........................ C04B 28/021 |

OTHER PUBLICATIONS

Fly Ash, Slag, Silica Fume, and Natural Pozzolans, Design and Control of Concrete Mixtures, EB001, University of Memphis, Civil Engr Analysis Lab Civl 1112, Chapter 3, 2016-2017.
Uwe Brunjes, Pozzolans . . . Trash to Treasure, Pozzolans for Concrete and Alternative Cements, 2016.
GCC Examination Report for Application No. GC2018-34618 dated Sep. 9, 2020.
A. Abdullah, M. S Jaafar, Y. H Taufiq-Yap, A Alhozaimy, A. Al-Negheimish, and J. Noorzael "The effect of various chemical activators on pozzolanic reactivity_ A review".
M. Criado "Effect of sodium sulfate on the alkali activation of fly ash"—abstract only.
Zichao Wu and Tarun R. Naik "Chemically Activated Blended Cements"—abstract only.
Ali Allahverdi and Jaleh Ghorbani "Chemical Activation and Set Acceleration of Lime—Natrual Pozzolan Cement".
Caijun Shi "Pozzolanic reaction in the presence of chemical activators, Part II Reaction products and mechanism"—abstract only.

* cited by examiner

ACCELERATORS FOR COMPOSITE CEMENT COMPOSITIONS

BACKGROUND

In well cementing, such as well construction and remedial cementing, cement compositions are commonly utilized. Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

Setting times for cement compositions may be adjusted with accelerators. Accelerators speed up the time required for a cement composition to become hardened in a reaction process that shortens WOC (Wait On Cement) time and provides faster drill out, thus saving rig time. This reaction process may be referred to as cement hydration whereby water induces chemical reactions that ultimately lead to bonding. Accelerators essentially speed the reaction with water, which in turn reduces (a) thickening time and/or increases (b) early compressive strength development after set.

Cement compositions may typically include Portland cement. While Portland cement provides a number of beneficial mechanical properties, Portland cement generally is a major component of the cost for the cement compositions. To reduce the cost of such cement compositions, composite cement compositions have been developed in which the concentration of Portland cement has been reduced by inclusion of supplementary cement materials, such as fly ash, volcanic rock, and slag, that can contribute to the mechanical properties of the set cement by cementitious activity. However, while such composite cement compositions may reduce cost, their design may be challenging as conventional cement additives may function differently in compositions with reduced Portland cement content. For example, accelerators that may function well in Portland cement may not provide the same effects in composite cement compositions.

BRIEF DESCRIPTION OF THE DRAWINGS

These drawings illustrate certain aspects of some of the embodiments of the present invention, and should not be used to limit or define the invention.

DETAILED DESCRIPTION

Figure 1:
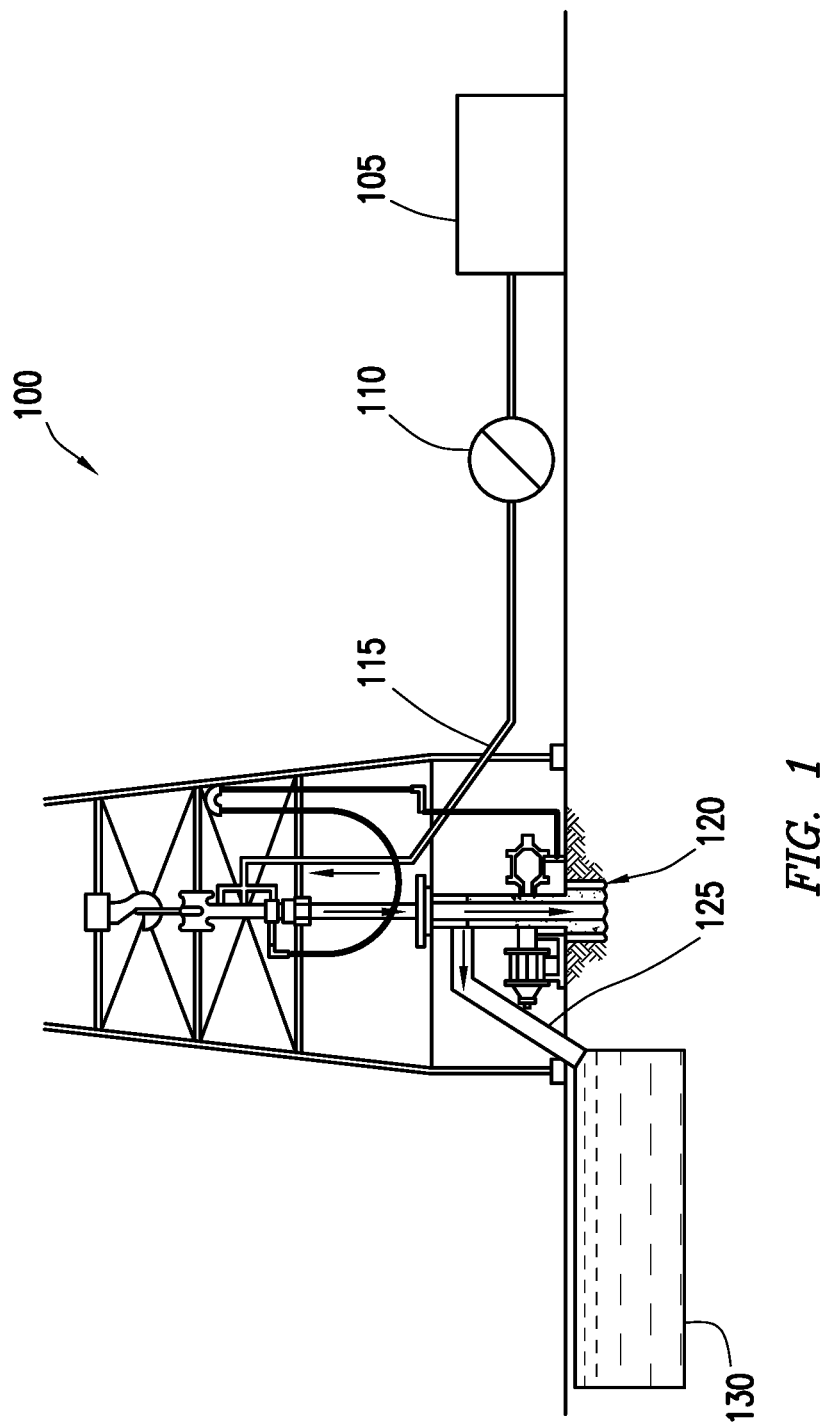
FIG. 1 is a schematic illustration of showing introduction of a composite cement composition into a wellbore.

The present disclosure may generally relate to cementing methods and systems. Provided herein are accelerators for composite cement compositions. In particular, the accelerators may comprise a combination of different salts, namely sodium chloride and sodium sulfate. The accelerators may be used in composite cement compositions to induce enhanced compressive strengths. Surprisingly, the use of the combination of sodium chloride and sodium sulfate as an accelerator in composite cement compositions may provide enhanced compressive strength while each salt alone exhibited little to no effect.

The composite cement compositions may comprise a pozzolan and water. An accelerator comprising sodium chloride and sodium sulfate may be included in the composite cement composition to enhance compressive strength. In addition, the composite cement compositions may be considered "low Portland cement compositions," in that the composite cement compositions comprise Portland cement in an amount of about 50% or less by weight of cementitious components ("bwoc") present in the composite cement composition. Composite cement compositions may also be designed that are free (or essentially free) of Portland cement. As used herein, the term "cementitious component" refers to materials that possess cementitious properties, such as materials with hydraulic or pozzolanic activity. Optionally, the composite cement compositions may comprise calcium hydroxide and/or one or more additional cement additives.

The composite cement compositions may have a density suitable for a particular application. The composite cement compositions may have any suitable density, including, but not limited to, in the range of about 8 pounds per gallon ("ppg") to about 16 ppg (1 g/cm$^3$ to 1.9 g/cm$^3$). In the foamed examples, the foamed cement compositions of the present invention may have a density in the range of about 8 ppg to about 13 ppg (1 g/cm$^3$ to 1.6 g/cm$^3$) (or even lower). The composite cement compositions may be foamed or unfoamed or may comprise other means to reduce their densities, such as hollow microspheres, low-density elastic beads, or other density-reducing additives known in the art. Those of ordinary skill in the art, with the benefit of this disclosure, should recognize the appropriate density for a particular application.

The water used in the composite cement compositions may comprise, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the composite cement composition. The water may be included in an amount sufficient to form a pumpable slurry. The water may be included in the composite cement compositions in any suitable amount, including, but not limited to, the range of about 40% to about 200% bwoc. In some examples, the water may be included in an amount in the range of about 40% to about 150% bwoc.

The composite cement compositions may comprise a pozzolan. The term "pozzolan" refers to siliceous or siliceous and aluminous materials that react with calcium hydroxide in the presence of water to form cementitious compounds. Any pozzolan suitable for use in subterranean cementing applications may be used in the composite cement compositions. Examples of suitable pozzolans may comprise fly ash, silica fume, agricultural waste ash, natural pozzolans (e.g., volcanic rock), or combinations thereof. Combinations of pozzolans may also be used, such as a combination of two or more different pozzolans. The pozzolan may be present in the composite cement compositions in an any suitable amount, including, but not limited to, in the range of about 5%, about 20% to about 100% bwoc, from about 50% to about 100% bwoc, from about 50% to about 80% bwoc, or from 80% about 100% bwoc. In some examples the pozzolan may be present in an amount ranging between any of and/or including any of about 5%, about 10%, about 20%, about 30%, about 40%, about 50%, about 60%, about 70%, about 80%, about 90% or about 100% bwoc. Those of ordinary skill in the art, with the benefit of this disclosure, should be able to select an appropriate type and amount of pozzolan for a particular application. Combinations of pozzolans may also be used, such as a combination of two or more different pozzolans. A composite cement composition may comprise a first pozzolan (e.g., volcanic rock, rice hull ash, or other suitable pozzolan) in an amount of about 20% to about 50% bwoc and a second pozzolan (e.g., fly ash, rice hull ash, or other suitable pozzolan) in an amount of about 20% to about 50% bwoc. A composite cement composition may comprise the first pozzolan in an amount of about 40% to about 45% bwoc, the second pozzolan in an amount of about 40% to about 45% bwoc, and the Portland cement in an amount of about 10% to about 20% bwoc. Another composite cement composition may comprise the first pozzolan in an amount of about 20% to about 30% bwoc, the second pozzolan in an amount of about 20% to about 30% bwoc, and cement kiln dust in an amount of about 40% to about 60% bwoc. Yet another composite cement composition may comprise the first pozzolan in an amount of about 35% to about 45% bwoc, the second pozzolan in an amount of about 35% to about 45% bwoc, and lime (e.g., hydrate lime) in an amount of about 10% to about 30% bwoc.

An example of a suitable pozzolan may comprise fly ash. The fly ash may be used alone or in combination with one or more additional pozzolans, such as silica fume, agricultural waste ash, or natural pozzolans. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water. Class F fly ash generally does not contain a sufficient amount of lime to induce a cementitious reaction, therefore, an additional source of calcium ions may be necessary for a composite cement composition comprising Class F fly ash. In some embodiments, lime may be mixed with Class F fly ash in an amount in the range of about 0.1% to about 100% by weight of the fly ash. In some instances, the lime may be hydrated lime. Suitable examples of fly ash comprise, but are not limited to, POZMIX® A cement additive, commercially available from Halliburton Energy Services, Inc., Houston, Tex.

Another example of a suitable pozzolan may comprise silica fume. The silica fume may be used alone or may be used in combination with one or more additional pozzolans, such as fly ash, agricultural waste ash, or natural pozzolans. Silica fume may alternatively be referred to as "microsilica" or "condensed silica fume." Silica fume is generally a byproduct material that may be obtained, for example, by reduction of quartz with coal in the manufacture of certain alloys. Silica fume may be processed after recovery, for example, to control particle size. Silica fume may be extremely fine, for example, with a mean particle size of less than 1 micron and, alternatively, less than 0.2 microns. The mean particle size, as used herein, corresponds to d50 values as measured by particle size analyzers such as those manufactured by Malvern Instruments, Worcestershire, United Kingdom. Silica fume may have a high surface area and is generally available in either a powder form or liquid.

Another example of a natural pozzolan may comprise an agricultural waste ash. The agricultural waste ash may be used alone or may be used in combination with one or more additional pozzolans, such as fly ash, silica fume, or natural pozzolans. Examples of agricultural waste ash that may be used in the composite cement composition comprise, for example, wood (e.g., sawdust, bark, twigs, branches, other waste wood) ash, tree leave ash, corn cob ash, rice hull ash, cane (e.g., sugar cane) ash, bagasse ash, grain (e.g., amaranth, barley, corn flaxseed, millet, oat, quinoa, rye, rice, wheat etc.) and related by-product(s) (e.g., husks, hulls, etc.) ash, orchard ash, vine trimming ash, grass (e.g., Korai, Tifton, native shiba, etc.) ash, straw ash, ground nut shell ash, legume (e.g., soybean) ash, and combinations thereof.

Another example of a suitable pozzolan may comprise natural pozzolans. Natural pozzolans are generally present on the Earth's surface and may exhibit pozzolanic activity. Suitable natural pozzolans may comprise volcanic rock, diatomaceous earth, metakaolin, zeolite, calcined clays, shale (e.g., calcined shale, opaline shale, etc.), and combinations thereof. The natural pozzolans may be ground or unground. Natural pozzolans may comprise materials, such as calcined clays, metakaolin, and calcined shale, that have been heat treated, for example, in a kiln to enhance their pozzolanic activity. Generally, the natural pozzolans may have any particle size distribution as desired for a particular application. The natural pozzolans may have any suitable particle size, including, but not limited to, a mean particle size in a range of from about 0.1 microns to about 200 microns, or even smaller. In specific examples, the natural pozzolans may have a mean particle size in a range of from about 1 micron to about 200 micron, from about 5 microns to about 100 microns, or from about 10 micron to about 50 microns. One of ordinary skill in the art, with the benefit of this disclosure, should be able to select a natural pozzolan and particle size suitable for use for a chosen application.

As previously described, the composite cement compositions may optionally comprise hydrated lime. As used herein, the term "hydrated lime" will be understood to mean calcium hydroxide. The hydrated lime may be provided as quicklime (calcium oxide) which hydrates when mixed with water to form the hydrated lime. For example, quicklime may be used in preparing the cement composition, which will hydrate to form the hydrated lime. The hydrated lime may be included in the composite cement composition, for example, to form provide a pozzolanic reaction with the pozzolan in the composite cement composition. For example, the hydrated lime may be included in a pozzolan-to-hydrated-lime weight ratio of about 10:1 to about 1:1 or a ratio of about 3:1 to about 5:1. Where present, the hydrated lime may be included in the set-delayed cement compositions in an amount in the range of from about 10% to about 100% by weight of the pozzolan, for example. In some examples, the hydrated lime may be present in an amount ranging between any of and/or including any of about 10%, about 20%, about 40%, about 60%, about 80%, or about 100% by weight of the pozzolan. One of ordinary skill in the art, with the benefit of this disclosure, should recognize the appropriate amount of hydrated lime to include for a chosen application.

The composite cement compositions may comprise Portland cement. Portland is generally a hydraulic cement that sets and hardens by reaction with water. Portland cements that are suited for use in the present disclosure may be classified as Classes A, C, G, and H cements according to American Petroleum Institute, API Specification for Materials and Testing for Well Cements, API Specification 10, Fifth Ed., Jul. 1, 1990. In addition, in some examples, Portland cements suitable for use may be classified as ASTM Type I, II, or III. The composite cement compositions disclosed herein may be considered "low Portland," as they may comprise the Portland cement in an amount of about 40% bwoc or less, about 30% bwoc or less, or about 20% bwoc or less. One of ordinary skill in the art, with the benefit of this disclosure, should recognize the appropriate amount of Portland cement to include for a chosen application.

In addition to Portland cement, the composite cement compositions may further comprise one or more additional cementitious component with cementitious activity, such as cement kiln dust, slag cement, high alumina content cement, and gypsum cement, among others. Other additives suitable for use in cementing operations also may be included the composite cement compositions. Examples of such additives include, but are not limited to: weighting agents, retarders, activators, gas control additives, lightweight additives, gas-generating additives, mechanical-property-enhancing additives, lost-circulation materials, filtration-control additives, fluid-loss-control additives, defoaming agents, foaming agents, dispersants, thixotropic additives, suspending agents, and combinations thereof. One of ordinary skill in the art, with the benefit of this disclosure, should be able to select an appropriate additive for a particular application.

As previously described, an accelerator comprising sodium chloride and sodium sulfate may be used to enhance compressive strength of the composite cement composition. The sodium sulfate may be used in any suitable hydration state, including, but not limited to, heptahydrate sodium sulfate, decahydrate sodium sulfate, and anhydrous sodium sulfate. Combinations of different hydration states may also be used. In addition, while sodium chloride and sodium sulfate are described herein, it should be understood that the disclosure should not be limited to only salts formed with sodium cations and may include other chloride and sulfate salts formed other monovalent and divalent cations, including, but not limited to, potassium cations, calcium cations, and magnesium cations, among others. The sodium chloride and sodium sulfate may be used in any suitable sodium-chloride-to-sodium-sulfate weight ratio, including, but not limited to, about 10:90 to about 90:10, about 25:75 to about 75:25, or about 40:60 to about 60:40. As illustrated in the following examples, a sodium-chloride-to-sodium-sulfate weight ratio of about 50:50 has been shown to enhance compressive strength development of composite cement compositions as compared to either the sodium chloride or the sodium sulfate alone. In addition, the combination of the sodium chloride and sodium sulfate has been shown to have synergistic effects with respect to compressive strength. The accelerator may be used in an amount sufficient to provide a desirable level of acceleration, including, but not limited to, an amount of about 1% to about 10% bwoc, about 2% to about 8% bwoc, or about 3% to about 6% bwoc. One of ordinary skill in the art, with the benefit of this disclosure, should recognize the appropriate amount of the accelerator to include for a chosen application.

The composite cement composition with the accelerator may set to have a desirable compressive strength. Compressive strength is generally the capacity of a material or structure to withstand axially directed pushing forces. The compressive strength may be measured at a specified time after the composite cement composition has been prepared and the resultant composition is maintained under specified temperature and pressure conditions. Compressive strength can be measured by either destructive or non-destructive methods. The destructive method physically tests the strength of set cement samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann® Instrument Company, Houston, Tex. Compressive strength values may be determined in accordance with API RP 10B-2, *Recommended Practice for Testing Well Cements*, First Edition, July 2005.

The composite cement compositions may develop a suitable 24-hour compressive strength, including, but not limited to, in the range of from about 100 psi (7 kg/cm$^2$) to about 5000 psi (352 kg/cm$^2$), alternatively, from about 200 psi (14 kg/cm$^2$) to about 4500 psi (316 kg/cm$^2$), or alternatively from about 500 psi (35 kg/cm$^2$) to about 4000 psi (281 kg/cm$^2$). The compressive strength values may be determined, for example, using destructive or non-destructive methods at a temperature of approximately 100° F. (38° C.). By inclusion of the accelerator disclosed herein, the compressive strength may be increased by about 10%, about 50%, about 100%, about 200%, about 300%, or more over the same composition with no accelerator.

The composite cement composition with the accelerator may also have desirable thickening times. Thickening time typically refers to the time a fluid, such as a cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. The composite cement compositions may have any suitable thickening time, including, but not limited to, greater than about 1 hour, alternatively, greater than about 2 hours, alternatively greater than about 5 hours at 3,000 psi (211 kg/cm$^2$) and temperatures of about 140° F. (60° C.).

Suitable composite cement compositions may be prepared in accordance with any suitable technique. The desired quantity of water may be introduced into a mixer (e.g., a cement blender) followed by the dry blend. The dry blend may comprise the pozzolan and any additional solid additives, such as the Portland cement or additional cementitious components. Additional liquid additives, if any, may be added to the water as desired prior to, or after, combination with the dry blend. The acceleration may be added as a solid material and dry blend with the other solid additives, including the pozzolan and Portland cement, or may be added to the water, as desired for a particular application. This mixture may be agitated for a sufficient period of time to form a pumpable slurry. By way of example, pumps may be used for delivery of the composite cement composition into the wellbore. As will be appreciated, the composite cement composition and/or the dry blend may be prepared at the well site or prepared offsite and then transported to the well site. If prepared offsite, the dry blend and/or composite cement composition and may be transported to the well site using any suitable mode of transportation, including, but not limited to, a truck, railcar, barge, or the like. Alternatively, the composite cement composition and and/or dry blend may be formulated at the well site, for example, where the components of the composite cement composition and and/or dry blend may be delivered from a transport (e.g., a vehicle or pipeline) and then mixed prior to placement downhole. As will be appreciated by those of ordinary skill in the art, with the benefit of this disclosure, other suitable techniques for preparing the composite cement compositions and may be used in accordance with this disclosure.

As will be appreciated by those of ordinary skill in the art, the composite cement composition may be used in a variety of subterranean operations, including primary and remedial cementing. A composite cement composition and may be provided that comprises a pozzolan and water. An accelerator comprising sodium chloride and sodium sulfate may be included in the composite cement composition to enhance compressive strength. Optionally, the composite cement composition may comprise Portland cement and/or the additional additives disclosed herein. The composite cement composition may be introduced into a subterranean formation and allowed to set therein. As used herein, introducing the composite cement composition into a subterranean formation includes introduction into any portion of the subterranean formation, including, but not limited to, into a wellbore drilled into the subterranean formation, into a near wellbore region surrounding the wellbore, or into both.

In primary cementing, for example, the composite cement composition may be introduced into an annular space between a conduit located in a wellbore and the walls of a wellbore (and/or a larger conduit in the wellbore), wherein the wellbore penetrates the subterranean formation. The composite cement composition may be allowed to set in the annular space to form an annular sheath of hardened cement. The composite cement composition may form a barrier that prevents the migration of fluids in the wellbore. The composite cement composition may also, for example, support the conduit in the wellbore.

In remedial cementing, a composite cement composition may be used, for example, in squeeze-cementing operations or in the placement of cement plugs. By way of example, the composite composition may be placed in a wellbore to plug an opening (e.g., a void or crack) in the formation, in a gravel pack, in the conduit, in the cement sheath, and/or between the cement sheath and the conduit (e.g., a microannulus).

Accordingly, this disclosure describes systems, compositions, and methods that may use accelerators comprising sodium chloride and sulfate salt in cementing operations. The systems, compositions, and methods may include any of the following statements:

Statement 1. A method of cementing comprising: providing a composite cement composition comprising a pozzolan, an accelerator, and water, wherein the accelerator comprises a chloride salt and a sulfate salt, wherein the composite cement composition is free of Portland cement or comprises Portland cement in an amount of about 50% by weight of cementitious components or less; and allowing the composite cement composition to set.

Statement 2. The method of statement 1 further comprising introducing the composite cement composition into a wellbore.

Statement 3. The method of statement 2 wherein the composite cement composition is introduced into the wellbore using one or more pumps.

Statement 4. The method of any previous statement further comprising mixing the composite cement composition using mixing equipment.

Statement 5. The method of any previous statement the pozzolan comprises at least one material selected from the group consisting of fly ash, silica fume, agricultural waste ash, and a natural pozzolan.

Statement 6. The method of any previous statement, wherein the chloride salt comprise sodium chloride and the sulfate salt comprises sodium sulfate.

Statement 7. The method of any previous statement wherein the composite cement composition further comprises cement kiln dust, and wherein the pozzolan comprises fly ash and rice hull ash and/or sugar cane ash.

Statement 8. The method of any previous statement wherein the composite cement composition further comprises hydrated lime, wherein the pozzolan comprises fly ash and volcanic rock.

Statement 9. The method of any previous statement wherein the accelerator is present in an amount of about 1% to about 10% by weight of cementitious components, and wherein the chloride salt and the sulfate salt are present in a chloride-salt-to-sulfate-salt weight ratio of about 10:90 to about 90:10.

Statement 10. The method of any previous statement wherein the accelerator is present in an amount of about 2% to about 6% by weight of cementitious components, and wherein the chloride salt and the sulfate salt are present in a chloride-salt-to-sulfate-salt weight ratio of about 25:75 to about 75:25.

Statement 11. The method of any previous statement wherein the accelerator is present in an amount sufficient to provide over 300% increase in compressive strength as compared to a composite cement composition with no accelerator, wherein the compressive strength is a twenty-four hour compressive strength.

Statement 12. The method of any previous statement wherein the composite cement composition further comprises at least one material selected from the group consisting of hydrated lime, cement kiln dust, slag cement, high alumina content cement, and gypsum cement.

Statement 13. A composite cement composition comprising: a pozzolan; an accelerator, wherein the accelerator comprises a chloride salt and a sulfate salt; and water, wherein the composite cement composition is free of Portland cement or comprises Portland cement in an amount of about 50% by weight of cementitious components or less.

Statement 14. The composition of statement 13 wherein the pozzolan comprises at least one material selected from the group consisting of fly ash, silica fume, agricultural waste ash, and a natural pozzolan.

Statement 15. The composition of statement 13 or 14 wherein the composite cement composition further comprises cement kiln dust, and wherein the pozzolan comprises fly ash and rice hull ash and/or sugar cane ash.

Statement 16. The composition of any one of statements 13 to 15 wherein the composite cement composition further comprises hydrated lime, wherein the pozzolan comprises fly ash and volcanic rock.

Statement 17. The composition of any one of statements 13 to 16 wherein the chloride salt comprises sodium chloride and the sulfate salt comprises sodium sulfate, wherein the accelerator is present in an amount of about 1% to about 10% by weight of cementitious components, and wherein the chloride salt and the sulfate salt are present in a chloride-salt-to-sulfate-salt weight ratio of about 10:90 to about 90:10.

Statement 18. The composition of any one of statements 13 to 16 wherein the accelerator is present in an amount of about 2% to about 6% by weight of cementitious components, and wherein the chloride salt and the sulfate salt are present in a chloride-salt-to-sulfate-salt weight ratio of about 25:75 to about 75:25.

Statement 19. The composition of any one of statements 13 to 18 wherein the accelerator is present in an amount sufficient to provide over 300% increase in compressive strength as compared to a composite cement composition with no accelerator, wherein the compressive strength is a twenty-four hour compressive strength.

Statement 20. The composition of any one of statements 13 to 19 wherein the composite cement composition further comprises at least one material selected from the group consisting of hydrated lime, cement kiln dust, slag cement, high alumina content cement, and gypsum cement.

Statement 21. A system comprising: a composite cement composition comprising a pozzolan, an accelerator, and water, wherein the accelerator comprises a chloride salt and a sulfate salt, wherein the composite cement composition is free of Portland cement or comprises Portland cement in an amount of about 50% by weight of cementitious components or less; and a pump fluid fluidly coupled to a tubular in fluid communication with a wellbore, wherein the tubular is configured to convey the composite cement composition to the wellbore.

Statement 22. The system of statement 21, further comprising a vessel disposed upstream of the pump, wherein the composite cement composition is disposed in the vessel.

Methods of using the composite cement compositions described herein in well cementing will now be described in more detail with reference to FIGS. 1-2. FIG. 1 illustrates an example system 100 that may be used for preparation and delivery of a composite cement composition downhole. It should be noted that while FIG. 1 generally depicts a land-based operation, those skilled in the art should readily recognize that the principles described herein are equally applicable to subsea operations that employ floating or sea-based platforms and rigs, without departing from the scope of the disclosure. As illustrated on FIG. 1, the system 100 may include a vessel 105 and a pump 110. The pump 110 may be positioned downstream of the vessel 105 and may be fluidly coupled to a tubular 115 that is in fluid communication with the wellbore 120. The tubular 115 may be configured to circulate or otherwise deliver the composite cement composition to the wellbore 120. The tubular 115 may be comprised, for example, of one or more different pipes that extend into the wellbore 120. The pump 110 may be, for example, one or more high pressure or low pressure pumps, which may be depend on, for example, the viscosity and density of the composite cement composition. The pump 110 may draw the composite cement composition from the vessel 105, elevate the composite cement composition to an appropriate pressure, and then introduce the composite cement composition to the tubular 115 for delivery downhole. The vessel 105 and pump 110 may be disposed on one or more cement trucks, for example. While not illustrated, system 100 may further include a recirculating mixer, a batch mixer and/or a jet mixer, which may be used for example, in preparation and/or storage of the composite cement composition. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Figure 2:
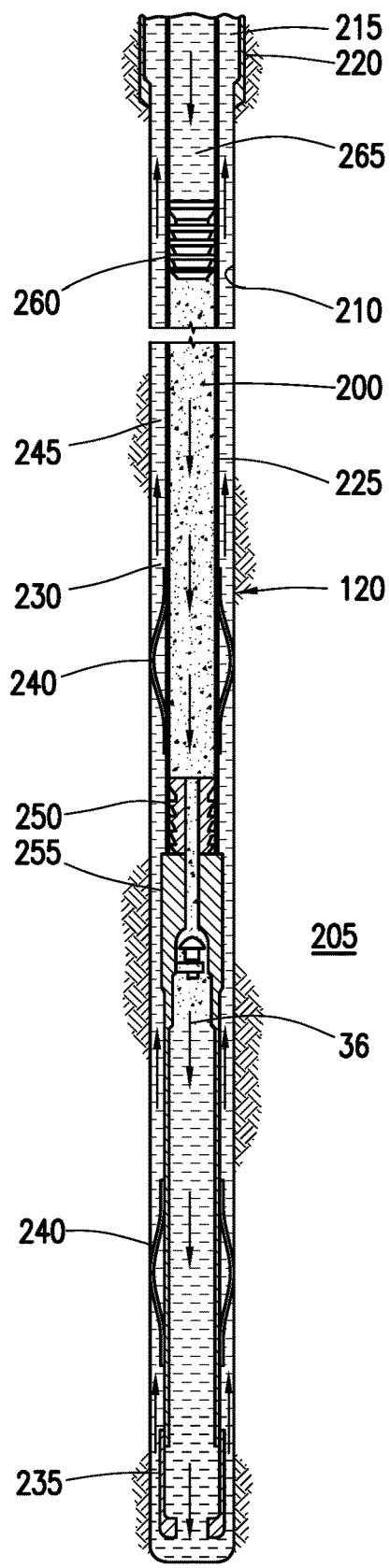
FIG. 2 is a schematic illustration of showing introduction of a composite cement composition into a wellbore.

Turning now to FIG. 2, the composite cement composition 200 may be placed into a subterranean formation 205. As illustrated, wellbore 120 may be drilled into the subterranean formation 205. While wellbore 120 is shown extending generally vertically into the subterranean formation 205, the principles described herein are also applicable to wellbores that extend at an angle through the subterranean formation 205, such as horizontal and slanted wellbores. As illustrated, the wellbore 120 comprises walls 210. A surface casing 215 may be cemented to the walls 210 of the wellbore 120 by cement sheath 220. One or more additional pipe strings (e.g., intermediate casing, production casing, liners, etc.), shown here as casing 225 may also be disposed in the wellbore 120. As illustrated, there is a wellbore annulus 230 formed between the casing 225 and the walls 210 of the wellbore 120 (and/or a larger conduit such as the surface casing 215). One or more centralizers 240 may be attached to the casing 225, for example, to centralize the casing 225 in the wellbore 120 prior to and during the cementing operation.

With continued reference to FIG. 2, the composite cement composition 200 may be pumped down the interior of the casing 225. The composite cement composition 200 may be allowed to flow down the interior of the casing 225 through the casing shoe 235 at the bottom of the casing 225 and up around the casing 225 into the wellbore annulus 230. The composite cement composition 200 may be allowed to set in the wellbore annulus 230, for example, to form a cement sheath that supports and positions the casing 225 in the wellbore 120. While not illustrated, other techniques may also be utilized for introduction of the composite cement composition 200. By way of example, reverse circulation techniques may be used that include introducing the composite cement composition 200 into the subterranean formation 205 by way of the wellbore annulus 230 instead of through the casing 225.

As it is introduced, the composite cement composition 200 may displace other fluids 245, such as drilling fluids and/or spacer fluids that may be present in the interior of the casing 225 and/or the wellbore annulus 230. At least a portion of the displaced fluids 245 may exit the wellbore annulus 230 via a flow line 125 and be deposited, for example, in one or more retention pits 130 (e.g., a mud pit), as shown on FIG. 1. Referring again to FIG. 2, a bottom plug 250 may be introduced into the wellbore 120 ahead of the composite cement composition 200, for example, to separate the composite cement composition 200 from the other fluids 245 that may be inside the casing 225 prior to cementing. After the bottom plug 250 reaches the landing collar 255, a diaphragm or other suitable device should rupture to allow the composite cement composition 200 through the bottom plug 250. In FIG. 2, the bottom plug 250 is shown on the landing collar 255. As illustrated, a top plug 260 may be introduced into the wellbore 120 behind the composite cement composition 200. The top plug 260 may separate the composite cement composition 200 from a displacement fluid 265 and also push the composite cement composition 200 through the bottom plug 250.

The exemplary composite cement compositions disclosed herein may directly or indirectly affect one or more components or pieces of equipment associated with the preparation, delivery, recapture, recycling, reuse, and/or disposal of the disclosed cement compositions. For example, the disclosed composite cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary composite cement compositions. The disclosed composite cement compositions may also directly or indirectly affect any transport or delivery equipment used to convey the composite cement compositions to a well site or downhole such as, for example, any transport vessels, conduits, pipelines, trucks, tubulars, and/or pipes used to compositionally move the composite cement compositions from one location to another, any pumps, compressors, or motors (e.g., topside or downhole) used to drive the composite cement compositions into motion, any valves or related joints used to regulate the pressure or flow rate of the composite cement compositions, and any sensors (i.e., pressure and temperature), gauges, and/or combinations thereof, and the like. The disclosed composite cement compositions may also directly or indirectly affect the various downhole equipment and tools that may come into contact with the composite cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the embodiments, the following examples of certain aspects of some embodiments are given. In no way should the following examples be read to limit, or define, the entire scope of the disclosure.

EXAMPLES

Example 1

In this example, the effectiveness of an accelerator comprising two different salts, sodium chloride and sodium sulfate, was evaluated. This example was performed using the formulation shown below in Table 1, wherein the concentration of the accelerators (sodium chloride, sodium sulfate, or both) was varied and compressive strength was measured. The concentration of sodium sulfate and sodium chloride were each varied from 0% to 8% bwoc. In one formulation, a combination of sodium sulfate (4% bwoc) and sodium chloride (4% bwoc) was used. The formulation had a density of 12 ppg (1.4 g/cm$^3$). All samples were mixed according to API procedures and then cured for 24 hours in a water bath at 92° F. (33° C.) and ambient pressure, after which samples were crushed (using a Tinius Olsen load frame) to obtain compressive strengths in "unconfined loading" conditions.

TABLE 1

| Material | % BWOC | Amount (g) | Specific Gravity | Vol (ml) |
| --- | --- | --- | --- | --- |
| Water | 96 | 206.4 | 0.998 | 206.8 |
| Cement Kiln Dust | 50 | 107.5 | 2.596 | 41.4 |
| Type F Fly Ash | 25 | 53.8 | 2.53 | 21.2 |
| Rice Hull Ash | 25 | 53.8 | 2.022 | 26.6 |
| Sodium Silicate | 2 | 8.6 | 2.66 | 3.2 |

Figure 3:
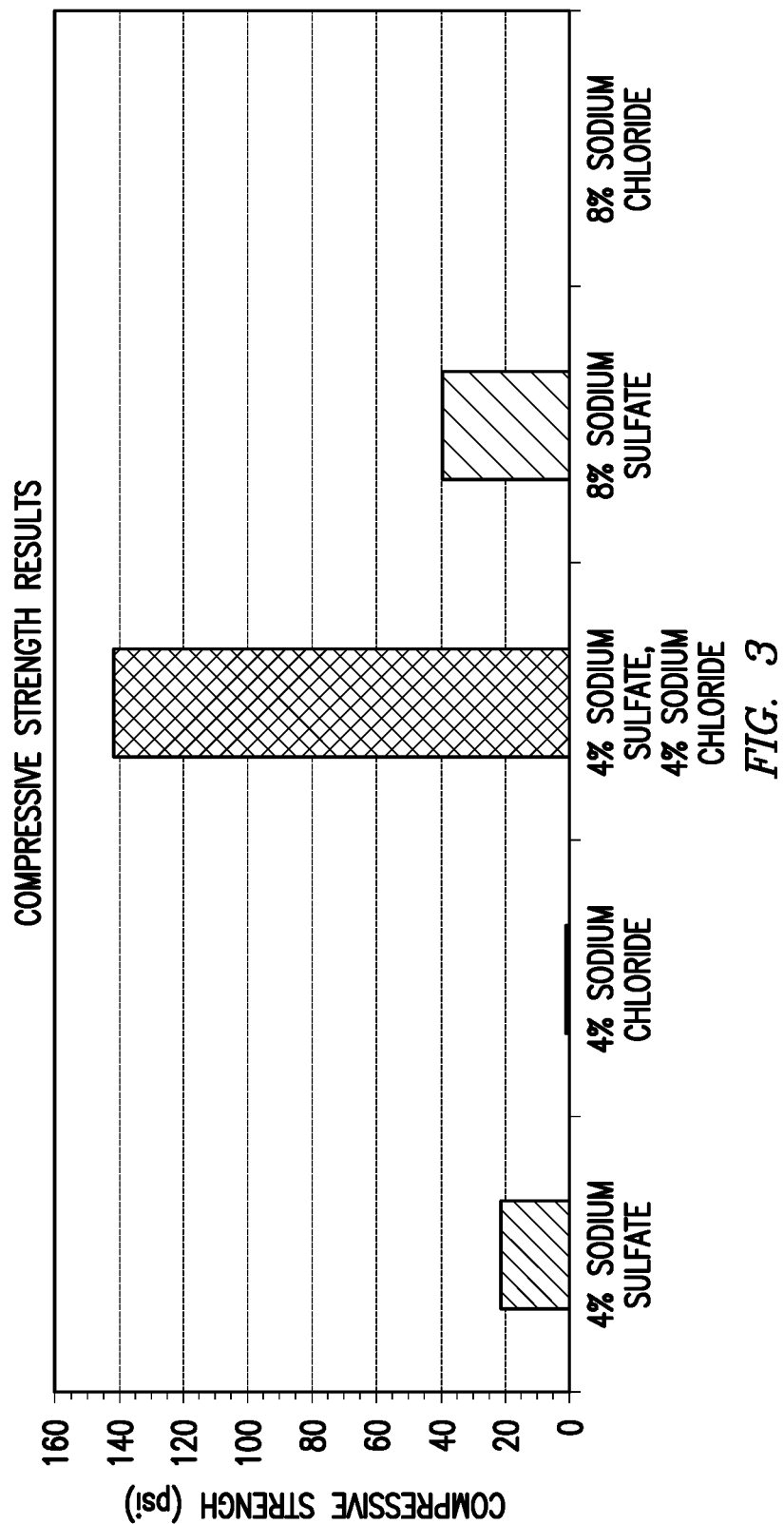
FIG. 3 is a chart showing crush strength for tests performed using different accelerators.

The results of this example are provided on FIG. 3. Surprisingly, the combination of the sodium chloride and sodium sulfate greatly enhanced compressive strength, while each salt alone had little, to no, effect. Indeed, the combination of salts produced compressive strengths almost three times greater than a slurry with an equal percentage of sodium sulfate (4% sodium chloride+4% sodium sulfate vs. 8% sodium sulfate). In addition, each of the formulations with only sodium chloride set, but had unmeasurable compressive strength at 24 hours, exhibiting a clay-like consistency.

Example 2

To further examine accelerators comprising two different salts, sodium chloride and sodium sulfate, varying concentrations of the 1:1 accelerator comprising sodium chloride and sodium sulfate were tested in three different composite cement compositions that were considered low Portland. All samples were mixed according to API procedures and then cured for 24 hours in a water bath at 100° F. (38° C.) and ambient pressure, after which samples were crushed (using a Tinius Olsen load frame) to obtain compressive strengths in "unconfined loading" conditions. The formulations and testing results are listed below in Tables 2-4.

TABLE 2

| 0% Portland Cement | Accelerator Concentration | | |
| --- | --- | --- | --- |
| Material | 0:0 | 2:2 | 4:4 |
| Fly Ash | 40 | 40 | 40 |
| Volcanic Rock | 40 | 40 | 40 |
| Hydrated Lime | 20 | 20 | 20 |
| Sodium Sulfate | 0 | 2 | 4 |
| Sodium Chloride | 0 | 2 | 4 |
| Compressive Strength @ 24 Hrs, 100° F. | 20 psi (1.4 kg/cm$^2$) | 263 psi (18.5 kg/cm$^2$) | 126 psi (8.9 kg/cm$^2$) |

TABLE 3

| 17% Portland Cement | Accelerator Concentration | | |
| --- | --- | --- | --- |
| Material | 0:0 | 2:2 | 4:4 |
| Fly Ash | 42 | 42 | 42 |
| Volcanic Rock | 41 | 41 | 41 |
| Class A Portland Cement | 17 | 17 | 17 |
| Sodium Sulfate | 0 | 2 | 4 |
| Sodium Chloride | 0 | 2 | 4 |

TABLE 3-continued

| 17% Portland Cement | Accelerator Concentration | | |
|---|---|---|---|
| Material | 0:0 | 2:2 | 4:4 |
| Compressive Strength @ 24 Hrs, 100° F. | 123 psi (8.6 kg/cm$^2$) | 575 psi (40.4 kg/cm$^2$) | 477 psi (33.5 kg/cm$^2$) |

TABLE 4

| 33% Portland Cement | Accelerator Concentration | | |
|---|---|---|---|
| Material | 0:0 | 2:2 | 4:4 |
| Class A Portland Cement | 33 | 33 | 33 |
| Fly Ash | 33 | 33 | 33 |
| Volcanic Rock | 34 | 34 | 34 |
| Sodium Sulfate | 0 | 2 | 4 |
| Sodium Chloride | 0 | 2 | 4 |
| Compressive Strength @ 24 Hrs, 100° F. | 459 psi (32.3 kg/cm$^2$) | 979 psi (68.8 kg/cm$^2$) | 785 psi (55 kg/cm$^2$) |

Figure 4:
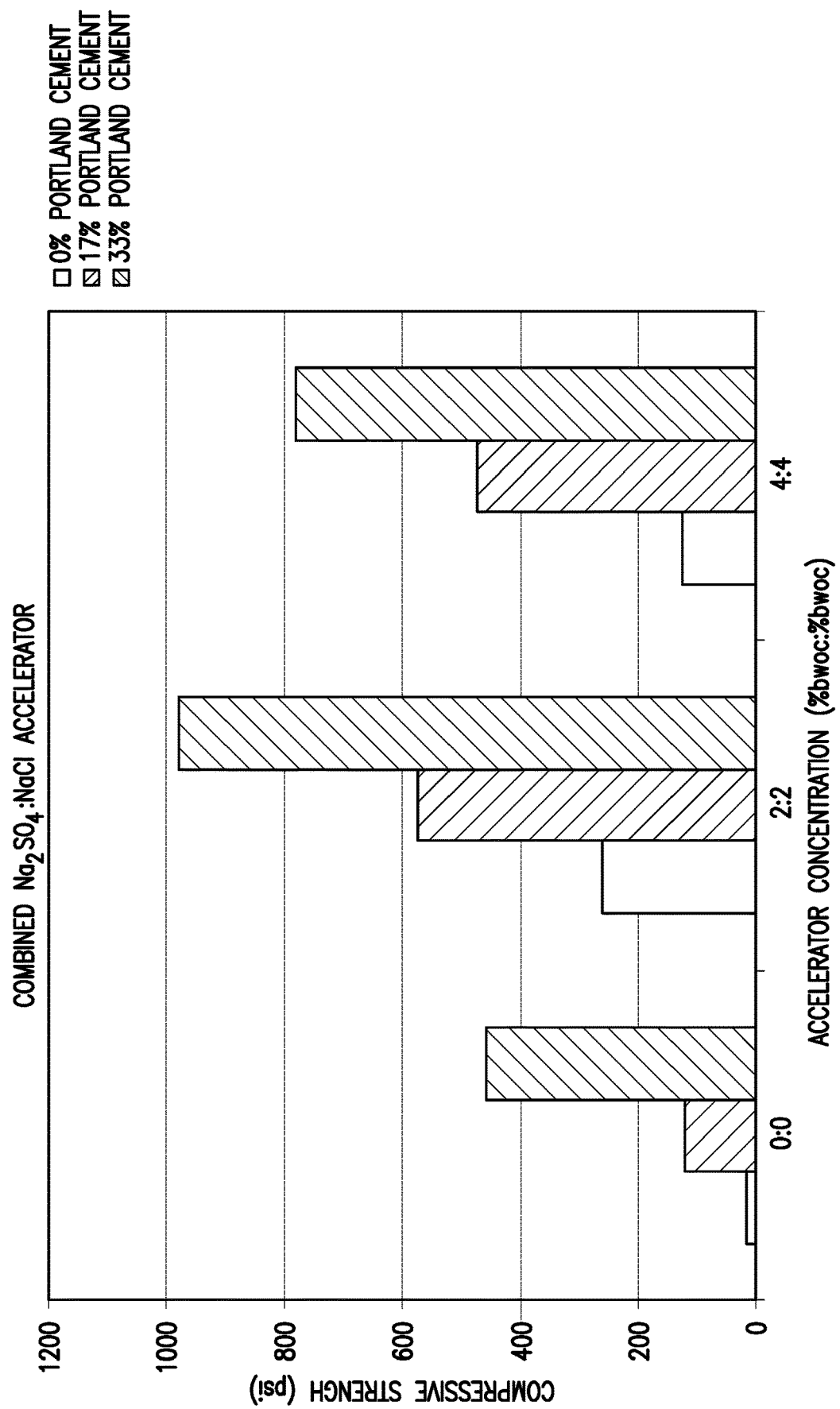
FIG. 4 is a chart showing crush strength for tests performed using different accelerator concentrations.
Figure 5:
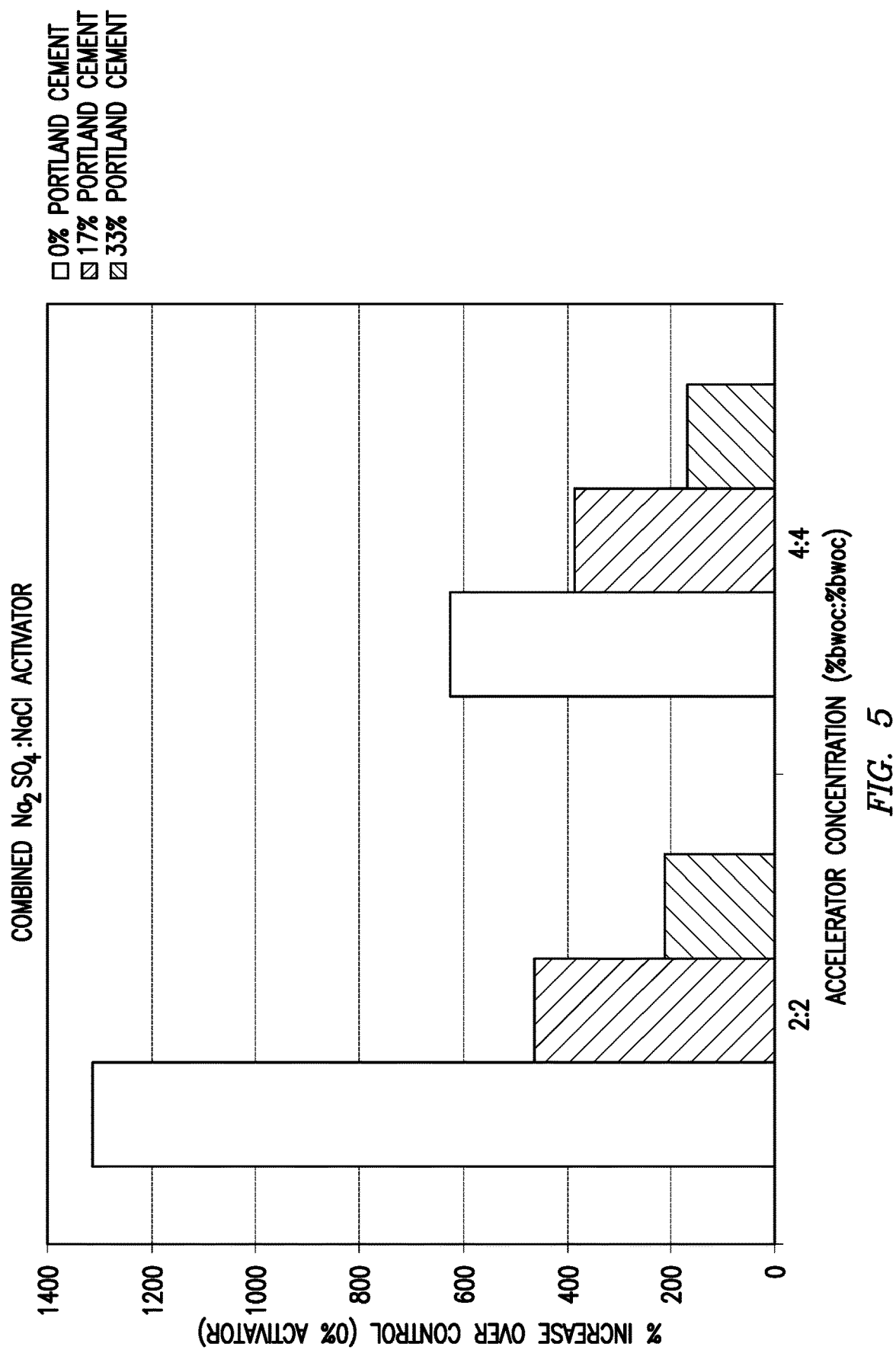
FIG. 5 is a chart showing crush strength increase for tests performed using different accelerator concentrations.
Figure 6:
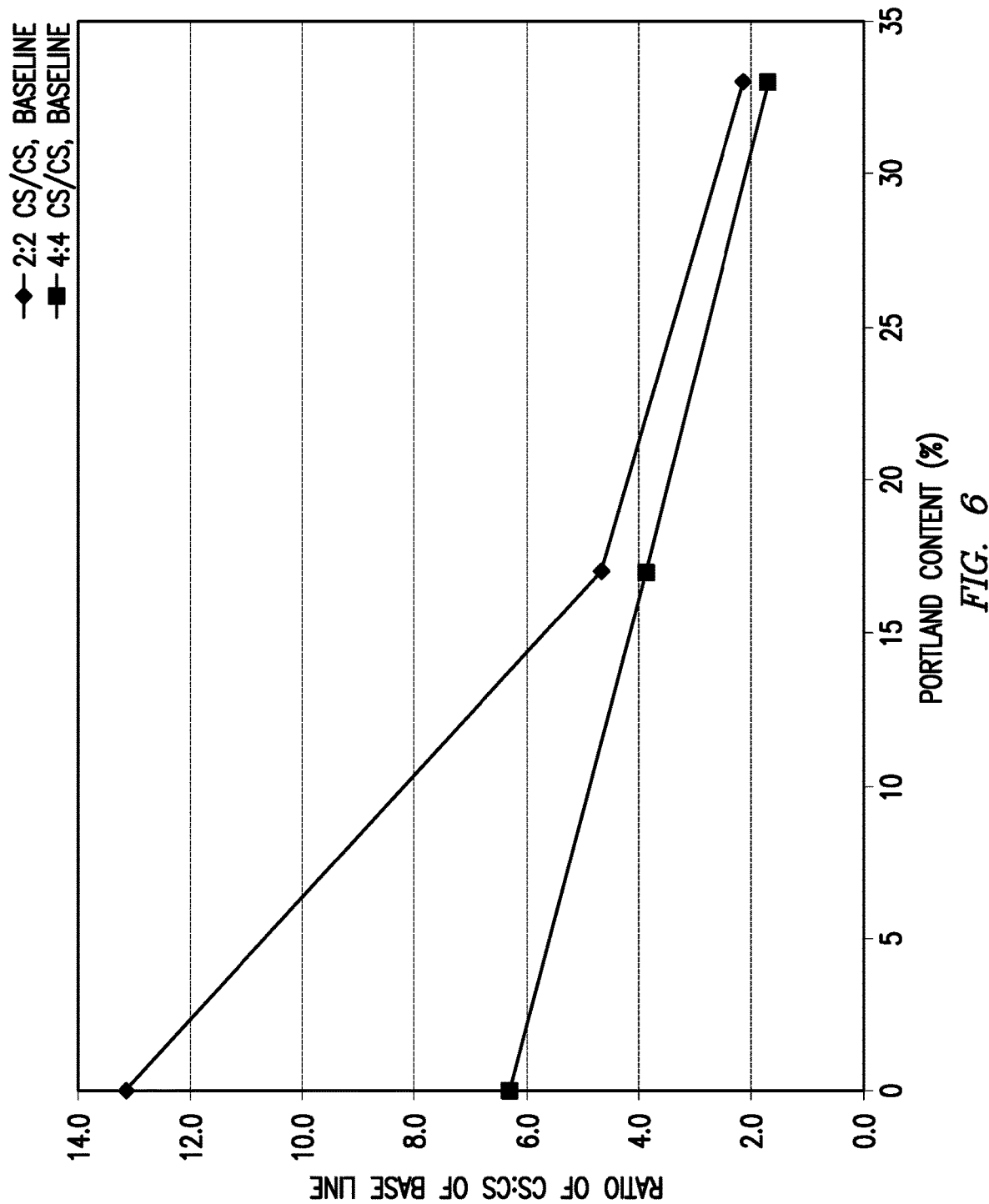
FIG. 6 is a chart showing compressive strength ratio versus Portland cement concentration for tests performed using different accelerator concentrations.

The results of this example are provided in the above tables and also graphically presented in FIG. 4. When compared to the composite cement composition with no accelerator, in each of the three variations, the 2:2 accelerator combination provide the most dramatic increase in compressive strength. FIG. 5 provides the percent increase in compressive for the data provided on Tables 2-4 versus the non-accelerated variations. FIG. 6 is a chart showing the ratio of compressive strengths versus Portland cement content. The ratio of compressive strengths is the measured compressive strength with accelerator versus the base line without any accelerator. As illustrated by FIGS. 5 and 6, the combined accelerator has a larger effect on the formulations with lower amounts of Portland cement and higher amounts of the pozzolan, volcanic rock and fly ash in this example, and less effect on the formulations with higher amounts of Portland cement and lower amounts of the pozzolan. Thus, the effectiveness of the accelerator comprising sodium sulfate and sodium chloride appears to decrease with increasing concentrations of Portland cement.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present invention may be modified and practiced in different but equivalent manners apparent to those skilled in the art having the benefit of the teachings herein. Although individual examples are discussed, the invention covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of cementing comprising:
   providing a composite cement composition comprising:
      a pozzolan,
      an accelerator, and
      water,
   wherein the accelerator comprises sodium chloride in an amount of about 2% by weight of cementitious components and sodium sulfate in an amount of about 2% by weight of cementitious components, wherein the composite cement composition comprises Portland cement in an amount of 17% to 35% by weight of cementitious components; and
   allowing the composite cement composition to set, wherein the accelerator has a sodium chloride to sodium sulfate weight ratio of about 50:50, and wherein the accelerator is present in an amount sufficient to provide over 300% increase in compressive strength as compared to a composite cement composition with no accelerator, wherein the compressive strength is a twenty-four hour compressive strength.

2. The method of claim 1, further comprising introducing the composite cement composition into a wellbore.

3. The method of claim 2, wherein the composite cement composition is introduced into the wellbore using one or more pumps.

4. The method of claim 1, further comprising mixing the composite cement composition using mixing equipment.

5. The method of claim 1, wherein the pozzolan comprises at least one material selected from the group consisting of fly ash, silica fume, agricultural waste ash, and a natural pozzolan.

6. The method of claim 1, wherein the composite cement composition further comprises cement kiln dust, and wherein the pozzolan comprises fly ash and rice hull ash and/or sugar cane ash.

7. The method of claim 1, wherein the composite cement composition further comprises hydrated lime, wherein the pozzolan comprises fly ash and volcanic rock.

8. The method of claim 1, wherein the accelerator is present in an amount of about 2% to about 4% by weight of cementitious components.

9. The method of claim 1, wherein the composite cement composition further comprises at least one material selected from the group consisting of hydrated lime, cement kiln dust, slag cement, high alumina content cement, and gypsum cement.

10. A composite cement composition comprising:
a pozzolan;
an accelerator, wherein the accelerator comprises sodium chloride in an amount of about 2% by weight of cementitious components and sodium sulfate in an amount of about 2% by weight of cementitious components; and
water,
wherein the composite cement composition comprises Portland cement in an amount of 17% to 35% by weight of cementitious components,
wherein the accelerator has a sodium chloride to sodium sulfate weight ratio of about 50:50, and wherein the accelerator is present in an amount sufficient to provide over 300% increase in compressive strength as compared to a composite cement composition with no accelerator, wherein the compressive strength is a twenty-four hour compressive strength.

11. The composition of claim 10, wherein the pozzolan comprises at least one material selected from the group consisting of fly ash, silica fume, agricultural waste ash, and a natural pozzolan.

12. The composition of claim 10, wherein the composite cement composition further comprises cement kiln dust, and wherein the pozzolan comprises fly ash and rice hull ash and/or sugar cane ash.

13. The composition of claim 10, wherein the composite cement composition further comprises hydrated lime, wherein the pozzolan comprises fly ash and volcanic rock.

14. The composition of claim 10, wherein the accelerator is present in an amount of about 2% to about 4% by weight of cementitious components.

15. The composition of claim 10, wherein the composite cement composition further comprises at least one material selected from the group consisting of hydrated lime, cement kiln dust, slag cement, high alumina content cement, and gypsum cement.

16. The composition of claim 10, wherein the composite cement composition has a density of about 1 g/cm$^3$ to about 2 g/cm$^3$.

* * * * *